United States Patent [19]

Miller

[11] Patent Number: 5,349,637
[45] Date of Patent: Sep. 20, 1994

[54] SECURITY BRACKET FOR PORTABLE TELEPHONES

[76] Inventor: Larry P. Miller, R.R. 1, Box 24, Hildreth, Nebr. 68947

[21] Appl. No.: 70,782

[22] Filed: Jun. 3, 1993

[51] Int. Cl.$^5$ ............................................. H04M 1/00
[52] U.S. Cl. .................... 379/445; 379/446; 379/454
[58] Field of Search .............. 379/451, 454, 437, 445, 379/446

[56] References Cited

U.S. PATENT DOCUMENTS

| | | |
|---|---|---|
| D. 285,789 | 9/1986 | Karlin . |
| D. 324,865 | 3/1992 | Cooper . |
| 4,196,319 | 4/1980 | Gates . |
| 4,750,204 | 6/1988 | Bartley et al. ...................... 379/445 |
| 4,763,352 | 8/1988 | Goff ..................................... 379/445 |
| 4,836,485 | 6/1989 | Cooper . |
| 4,937,860 | 6/1990 | Smith ................................... 379/445 |
| 5,060,260 | 10/1991 | O'Connell . |
| 5,109,411 | 4/1992 | O'Connell . |

Primary Examiner—James L. Dwyer
Assistant Examiner—Jack Chiang
Attorney, Agent, or Firm—Richard C. Litman

[57] ABSTRACT

A security bracket for a portable telephone provides locking security for at least the transceiver, battery, and carrying bag of such a telephone installed in a vehicle, while allowing ready access to the telephone handset. An open top container is dimensioned to receive the transceiver, battery and carrying bag, which are locked in place by a hinged, generally U shaped lock bar. The telephone hand set is placed atop and within the U of the lock bar where it also engages the transceiver for normal operation and provides access for ready use at all times. Thus, the security bracket provides deterrence against theft, as the only component readily removable is the telephone hand set, which is of little value without the remaining components which are secured within the container of the security bracket. A base supports the container, the base being securely mounted on the floor of the vehicle. The container may be angularly adjusted with respect to the base for ease of access to the telephone by the user. A pedestal mount may be interposed between the base and container to elevate the container to a user convenience height, when the bracket assembly is mounted in a vehicle having dimensions requiring the extra height mounting for the container. Preferably, the entire bracket assembly is made of sturdy material such as metal, more specifically, steel or aluminum.

20 Claims, 3 Drawing Sheets

SECURITY BRACKET FOR PORTABLE TELEPHONES

FIELD OF THE INVENTION

The present invention relates generally to locks and security devices for specialized use, and more specifically to an adjustable bracket or mount for a portable telephone (e.g., mobile cellular telephone) providing for the selective lockable security or ready for use containment of such a telephone.

BACKGROUND OF THE INVENTION

The use of mobile telephones, particularly cellular telephones, has become increasingly popular in automobiles and other motor vehicles. Accordingly, telephone companies have installed cellular transmission and reception facilities widely throughout the nation, particularly in more heavily populated areas. This has in turn led to even greater sales of such mobile cellular phones. The ever increasing competition in the sales, contracting and other fields has made the installation and use of such phones virtually a requirement in the automobiles or vehicles of many persons, in order to avoid losing a potential customer while driving or traveling between points. Also, such portable phones enable persons using them to make more efficient use of time.

Obviously, such mobile and/or cellular telephones are relatively costly devices due to their relatively high technology. Accordingly, they have unfortunately become extremely popular targets for thieves. Most persons wish to make maximum use of their phones, and accordingly keep them close at hand in the vehicle. This also generally results in their being in plain sight, further attracting potential thieves. While storage bags or containers are often provided for such telephone hand sets, the bags themselves are extremely portable articles and provide no additional deterrence to theft, unless the phone set and bag are removed and remain with the operator of the vehicle when the vehicle is unattended.

The need arises for a device capable of lockably securing a mobile or cellular telephone set in a vehicle when the set is not in use and/or the vehicle is unattended, and further provides for the containment of the telephone hand set for ready use when desired. The device must provide further for the storage of a foldable bag or other relatively soft and flexible container otherwise provided for the storage and/or carriage of the set when the telephone is not otherwise in use.

DESCRIPTION OF THE PRIOR ART

U.S. Pat. No. 4,196,319 issued to Frank V. Gates on Apr. 1, 1980 discloses a Vehicular Telephone Station Set Security Pedestal. While the device provides for the lockable storage of the telephone, such storage is in the enclosed base of the device; the telephone hand set must be removed from the base and installed on the upper pedestal for use, unlike the present invention.

U.S. Pat. No. 4,836,485 issued to Gershon Cooper on Jun. 6, 1989 discloses a Universally Adjustable Mounting Device. No locking means or storage container is disclosed.

U.S. Pat. No. 5,060,260 issued to Joseph J. O'Connell on Oct. 22, 1991 discloses a Mounting Cradle For A Portable Cellular Telephone. The device relies upon side gripping members to hold the phone, rather than a complete container, and no locking means are disclosed.

U.S. Patent No. 5,109,411 issued to Joseph .J. O'Connell on Apr. 28, 1992 discloses a Telephone Handset Cradle Mount providing adjustability similar to that disclosed in U.S. Pat. No. 5,060,260 disclosed above. Again, no enclosure or locking means are disclosed.

U.S. Pat. Des. No. 285,789 issued to James Karlin or, Sep. 23, 1986 discloses a design for a Mobile Telephone Assembly Including Handset, Cradle And Mounting. No storage enclosure or locking means are disclosed.

Finally, U.S. Pat. Des. No. 324,865 issued to Gershon N. Cooper on Mar. 24, 1992 discloses an Adjustable Support For A Cellular Telephone Or The Like. The design appears to be closely related to the device disclosed in U.S. Pat. No. 4,836,485 discussed above; no storage or locking means are disclosed.

None of the above noted patents, taken either singly or in combination, are seen to disclose the specific arrangement of concepts disclosed by the present invention.

SUMMARY OF THE INVENTION

By the present invention, an improved security bracket for portable telephones is disclosed.

Accordingly, one of the objects of the present invention is to provide an improved security bracket which providers for the lockable storage of a mobile or cellular telephone.

Another of the objects of the present invention is to provide an improved security bracket which provides for the ready use of the telephone hand set in the same container or enclosure in which the remainder of the telephone apparatus may be lockably stored.

Yet another of the objects of the present invention is to provide an improved security bracket which also provides for storage of any flexible container or bag which might be provided for the storage of a mobile or cellular telephone hand set.

Still another of the objects of the present invention is to provide an improved security bracket which includes angular adjustment means for the telephone storage portion of the device.

A further object of the present invention is to provide an improved security bracket which may be adapted to different heights according to the vehicle or other structure to which it is mounted.

An additional object of the present invention is to provide an improved security bracket which is of durable and sturdy construction in order to discourage potential theft of any telephone set which may be contained therein, and of the bracket itself.

A final object of the present invention is to provide an improved security bracket for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters denote corresponding features consistently throughout the several figures of the attached drawings.

DETAILED DESCRIPTION OF THE PREFERRED EMBODIMENTS

Figure 1:
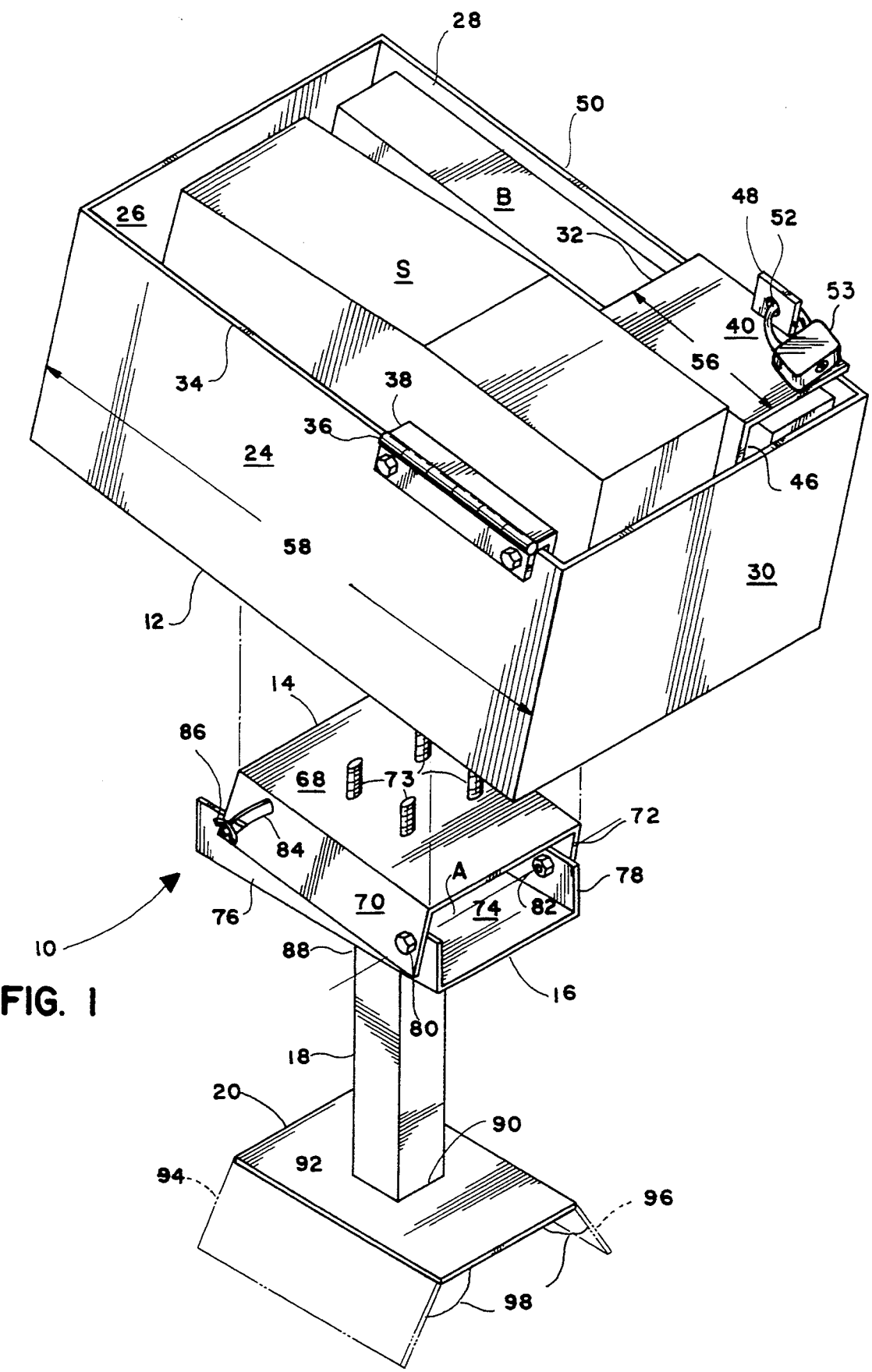
FIG. 1 is an exploded perspective view of the mobile cellular telephone security bracket of the present the invention, showing a portion of the cellular telephone apparatus lockably stored therein, with the hand set ready for use.

Referring now particularly to FIG. 1 of the drawings, the present invention will be seen to relate to a security bracket 10 for the storage and containment of a portable, mobile or cellular telephone and its associated hand set S. Bracket 10 generally comprises an open box or container portion 12 providing for the accessible storage of a hand set S and lockable storage of other articles such as the telephone transceiver T and carrying bag C (both shown in FIG. 2) and a telephone battery B, with an adjustable container base 14, a base support 16, a support column 18, and a mounting base 20.

The box or container portion 12 is formed of a bottom plate 22 (FIG. 2), and first, second, third and fourth sides 24, 26, 28, and 30, assembled so as to form a generally rectangular box structure with an open top. Container portion 12 further includes a locking bar 32, formed generally in the shape of an inverted U and serving to lockably retain a mobile telephone set M or other article thereunder and within the box portion 12 of security bracket 10, while allowing access to the telephone hand Set S. The lock bar 32 is secured to the upper edge 34 of the first side 24 of the box 12, preferably slightly spaced apart from the nearly adjacent fourth side 30, by a hinge 36.

Figure 2:
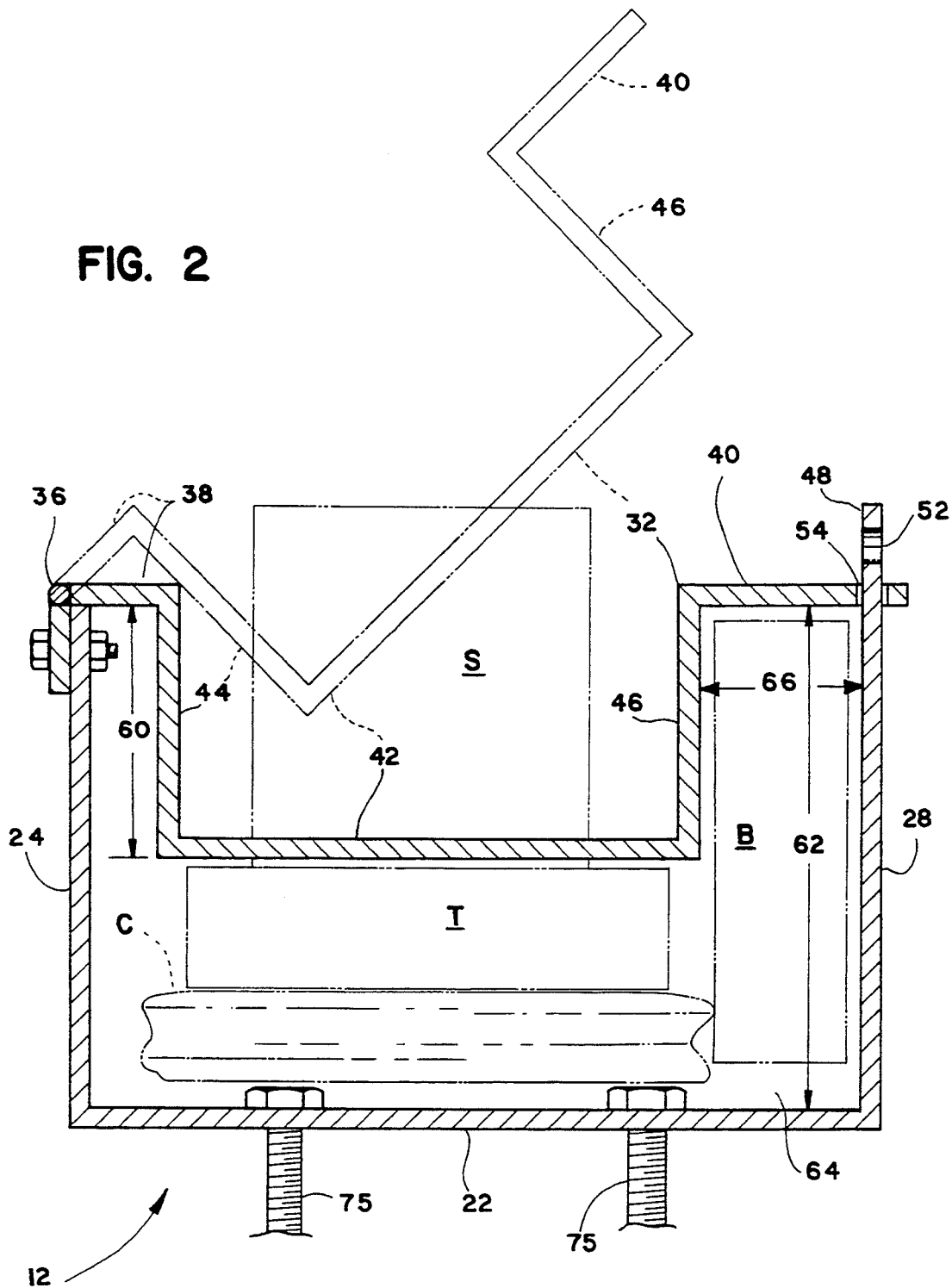
FIG. 2 is an end view in section of the hand set security bracket storage container portion with one end removed, Showing the arrangement of components and their storage, and further showing the operation of the hinged locking bar.

Lock bar 32 is formed having a hinge attachment portion 38, an opposite bar securing portion 40, and a lower guard portion 42, with the guard portion 42 joined to the hinge attachment portion 38 and the bar securing portion 40 respectively by depending first and second bar members 44 and 46; a clearer representation of the relationship of components 38 through 46 of lock bar 32 may be seen in FIG. 2.

The third side 28 of the box or container portion 12 includes a tab or staple 48 extending upwardly from the upper edge 50 thereof. Tab 48 includes a hole 52 providing for the insertion of a padlock or other suitable locking means 53 therethrough. The bar securing portion 40 of lock bar 32 includes a cooperating slot or passage 54 (FIG. 2), thereby providing the bar securing portion 40 of the lock bar 32 with the function of a hasp. When the lock bar 32 is moved to its closed position, as shown in FIG. 1 and indicated by the solid lines of the lock bar 32 in FIG. 2, the tab 48 extends upward through the passage 54, enabling a lock to be installed through the hole 52 in the tab 48 to lock the bar 32 in place and lockably secure a mobile telephone M and/or associated article(s), such as a folded hand set carrying or storage bag C, thereunder.

The width 56 of lock bar 32 is on the order of one third of the total length 58 of the box 12, thus exposing the "hang up" switch portion of a telephone transceiver T secured thereunder to allow a hand set S to be placed atop the lower guard portion 42 of the lock bar 32 and still rest upon and cooperate with the "hang up" and other portions of the transceiver T, even though the transceiver T may be locked in place within the box portion 12 by the lock bar 32. The lock bar 32 may be formed in greater or lesser widths relative to the length 58 of the container portion 12, as desired. The width 56 of bar 32 is still sufficient to preclude the direct removal of a relatively thick or bulky article such as a telephone transceiver T and battery B therefrom, without lifting the bar 32 as shown in FIG. 2. Furthermore, the depending sides 44 and 46 of the lock bar 32 have lengths 60 approximately one half the depth 62 of the box 12, thereby establishing storage room beneath the guard portion 42 of the bar 32 when the bar is in its closed position, as indicated in FIG. 2 of the drawings. Additional space 64 is provided beneath the bar securing portion 40 of lock bar 32 for other article(s) such as a battery B, due to the length 66 of the bar securing portion 40. The telephone hand set S may be left resting atop the guard portion 40 of the lock bar 32 and engaging the "hang up" portion of the transceiver T, for ready access while still securing the remainder of the mobile telephone apparatus. The depth 60 of the depending sides 44 and 46 provide for the lateral capture of the hand set S or other article therein, precluding its movement or significant shifting of position due to the vibration and movement within a moving motor vehicle.

The box or container portion 12 of bracket 10 is secured to an underlying container base 14 having a flat upper plate 68 with first and second opposite depending flanges 70 and 72. The bottom 22 of container portion 12 is permanently secured to the upper plate 68 of the container base 14, as with threaded studs 73 (FIG. 1), bolts 75 (FIG. 2), rivets, etc. Container base 14 is in turn supported by a base support 16, which base support 16 comprises an underlying plate 74 and first and second opposite upwardly extending flanges 76 and 78, which upward flanges 76 and 78 cooperate with the depending flanges 70 and 72 of the container base 14.

The first depending flange 70 of the container base 14 and first upward flange 76 of the base support 16, and second depending flange 72 and second upward flange 78, are respectively pivotally secured together along an axis A by means of pivot pins or bolts 80 and 82, thereby permitting the container base 14 (and the container 12 mounted thereon) to be pivotally adjusted about the axis A. Means for such pivotal adjustment is provided by means of two opposite arcuate slots 84 (only one of which is shown) respectively in the first and second depending flanges 70 and 72 of the container base portion 12, with locking means for a specific position provided by two wing nuts 86 (only one of which is shown) or other fasteners serving to lock the depending flange is 70 and 72 of the container base 14 respectively against the upward flanges 76 and 78 of the base support 16.

The container base support 16 is in turn permanently mounted (e.g., welded) to the upper end 88 of a support column 18, which support column 18 serves to elevate the box or container portion 12 (and therefore any included contents) to a more convenient level, as the mounting base for the entire apparatus 10 will normally be secured to the floor of a vehicle. The support column 18 is on the order of four inches in height in the first embodiment of the present invention, but obviously may be of any convenient height.

The opposite, lower end 90 of the support column 18 is welded or otherwise secured to the central plate 92 of the mounting base 20. The mounting base 20 may also include optional first and second mounting base flanges 94 and 96, which depend from opposite edges of the mounting base 18 central plate 92. Preferably, these base flanges 94 and 96 are spread and join with the central plate 92 at an obtuse angle 98, in order to match more closely the angle of a transmission or driveshaft tunnel or other raised central area in a vehicle. The central plate 92 and/or first and second flanges 94 and 96 may be bolted or otherwise secured to the tunnel or floor structure of the vehicle, thereby preventing ready theft of the bracket 10 and any of its contents, such as a hand set S, lockably secured therein.

Figure 3:
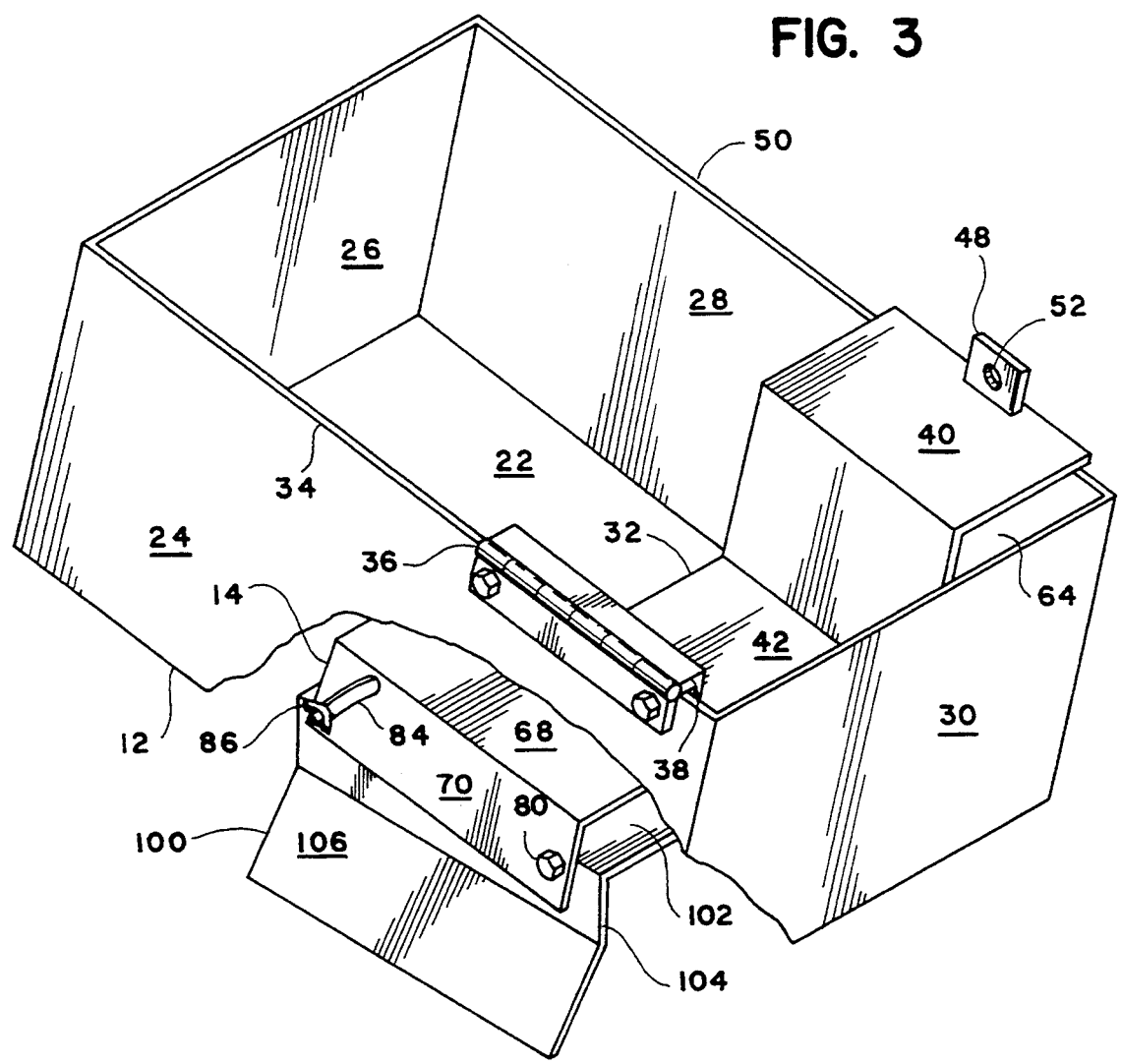
FIG. 3 is a partially broken away perspective view of an alternative embodiment of the present invention, showing a different mounting arrangement.

An alternative embodiment of the present invention is shown in FIG. 3. The upper elements of the embodiment of FIG. 3, comprising the container or box 12 with its lock bar 32 and the underlying container base 14, will be seen to be identical to those of FIG. 1. However, an alternative combination base support and mounting base 100 is provided for cases in which no significant raised elevation, requiring the addition of an intermediate support column 18, is needed. Combination support and mounting base 100 comprises an upper plate 102, with two opposed depending side flanges 104 (only one of which is shown in FIG. 3) which serve the same function as the upwardly extending flanges 76 and 78 of the base support 16 of FIG. 1, i.e., providing for the pivotal attachment of the overlying container base 14 with its container 12 attached thereabove. Each of the depending side flanges 104 has a downwardly depending and outwardly flared mounting flange 106 (one of which is shown in FIG. 3), serving the same purpose as the first and second flanges 94 and 96 of the mounting 20 of FIG. 1, i.e., providing for the mounting of the device to a vehicle floor, transmission tunnel, etc.

Accordingly, the present invention will be seen to provide for the lockable storage of a mobile or cellular telephone M therewithin, as described above. When the bracket of the present invention is installed within a vehicle, easy theft of phone set M and/or other article(s) lockably secured therein by means of lock bar 32 is precluded. Yet, the hand set portion S of such a mobile telephone M secured therein is readily accessible so the vehicle operator may readily use the mobile phone as desired. The various components comprising the mobile telephone, such as the transceiver S, carrying bag C, and battery B, may be placed within the container 12 and arranged to permit the closing of the lack bar 32. The lock bar 32 may then be lowered, and the hand set T placed atop the lower guard portion 42 of the lock bar 32 for ready access. Yet, the hand set S is precluded from shifting or movement out of the box or container portion 12, by means of the side walls 24 through 30 of the container 12 and the depending member: 44 and 46 of the lock bar 12, which serve to retain the hand set S therewithin even in its unlocked and accessible position. As the hand set portion S is of little or no value without the remainder of the mobile telephone apparatus M locked within the portion 12 of the present invention, deterrence is provided against theft of a telephone apparatus secured by means of the present invention, while ready access to the hand set portion S is provided at all times. Thus, the present invention provides for the locked storage and retaining of an article, such as a cellular telephone M, therewithin, while providing ready access to the handset portion S. The two embodiments of the present invention provide alternatives for the height of the container portion 12, depending upon the specific vehicle in which installation is desired and the desires and needs of the operator(s) of the vehicle. The components of the embodiments of the security bracket of the present invention are preferably formed of a strong, durable material, such as steel, aluminum, or other metal, in order to provide the required strength for such an anti-theft device. However, other material may be used for the construction of the embodiments of the present invention as desired.

It is to be understood that the present invention is not limited to the sole embodiments described above, but encompasses any and all embodiments within the scope of the following claims.

I claim:

1. A security bracket for use with a portable telephone apparatus comprising at least a transceiver, battery, carrying bag, and hand set, with the telephone apparatus installable in a vehicle, said security bracket comprising:

a mounting base, a support column, an upper base support, a container base, and an open container;

said mounting base comprising a central plate, with said mounting base providing attachment means for said security bracket to an underlying structure;

said support column having a lower end and an upper end, with said lower end being secured to said mounting base central plate;

said upper base support comprising an underlying plate secured to said support column upper end, with said underlying plate having first and second flanges upwardly extending therefrom and oppositely disposed upon said underlying plate;

said open container comprising a bottom and first, second, third, and fourth sides defining a generally rectangular volume having an open top, with said open container bottom secured to an upper plate of said container base;

said open container first and third sides being disposed opposite one another and each having an upper edge and a lower edge, with said open container further including a lock bar hingedly attached to said upper edge of said first side and extending across said rectangular volume of said open container to cooperate with a securing means extending from said upper edge of said third side of said open container;

said lock bar comprising a hinge securing portion, an opposite securing portion, a first member depending from said hinge securing portion, a second member depending from said opposite securing portion; and a lower guard portion extending between said first depending member and said second depending member, whereby said lock bar defines a substantially U shaped member with said lower guard portion disposed within said open container when said lock bar is extended across said open container; whereby, a portable telephone apparatus is protected from theft by said lock bar when the apparatus is placed within said open container and said lock bar is lockably secured thereover, and the hand set of the portable telephone apparatus is placed across said lower guard portion of said lock bar; the hand set further engages the transceiver of the portable telephone apparatus, thereby providing normal operation for the telephone apparatus and further positioning the telephone hand set in a position ready for use and protected from lateral movement by means of said first, second, third, and fourth sides of said open container and said first and second depending members of said lock bar.

2. The security bracket of claim 1 wherein:
said hinge securing portion, said opposite securing portion, said first and second depending members, and said lower guard portion of said lock bar are each formed of planar sheet material.

3. The security bracket of claim 1 wherein:
said container base comprises first and second flanges which are pivotally secured to said underlying plate first and second flanges respectively.

4. The security bracket of claim 3, further including:
locking means removably attached to said container base first and second flanges and said underlying plate first and second flanges, whereby said container base first and second flanges are selectively immovably secured to said underlying plate first and second flanges respectively.

5. The security bracket of claim 1 wherein:
said first and third sides of said open container each have opposite ends, with said open container first and third sides opposite ends defining the length of said open container; and,
said lock bar is provided with a width substantially one third of said length of said open container.

6. The security bracket of claim 1 wherein:
said upper edge and said lower edge of said first and third sides of said open container define the depth of said open container; and,
said first and second depending members of said lock bar each have lengths substantially one half of said depth of said open container.

7. The security bracket of claim 1 wherein:
said mounting base includes opposite first and second flanges, said first and second flanges of said mounting base each forming an obtuse included angle with said mounting base central plate to provide for the attachment of said mounting base to a central tunnel structure of a vehicle.

8. The security bracket of claim 1 wherein:
said security bracket is formed of metal.

9. The security bracket of claim 8 wherein:
said security bracket is formed of steel.

10. The security bracket of claim 8 wherein:
said security bracket is formed of aluminum.

11. A security bracket for use with a portable telephone apparatus comprising at least a transceiver, battery, carrying bag, and hand set, with the telephone apparatus installable in a vehicle, said security bracket comprising:
a combination mounting base and base support, a container base, and an open container;
said combination mounting base and base support comprising an upper plate having first and second flanges oppositely depending therefrom and first and second attachment members respectively depending and outwardly flared from said first and second flanges, with said combination mounting base and base support first and second attachment members providing attachment means for said security bracket to an underlying structure;
said container base comprising an upper plate having first and second flanges oppositely depending therefrom, with said container base first and second flanges respectively cooperating with and secured to said combination mounting base and base support first and second flanges;
said open container comprising a bottom and first, second, third, and fourth sides defining a generally rectangular volume having an open top, with said open container bottom secured to said upper plate of said container base;
said open container first and third sides being disposed opposite one another and each having an upper edge and a lower edge, with said open container further including a lock bar hingedly attached to said upper edge of said first side and extending across said rectangular volume of said open container to cooperate with a securing means extending from said upper edge of said third side of said open container;
said lock bar comprising a hinge securing portion, an opposite securing portion, a first member depending from said hinge securing portion, a second member depending from said opposite securing portion, and a lower guard portion extending between said first depending member and said second depending member; whereby said lock bar defines a substantially U shaped member with said lower guard portion disposed within said open container when said lock bar is extended across said open container; whereby,
a portable telephone apparatus is protected from theft by said lock bar when the apparatus is placed within said open container and said lock bar is lockably secured thereover, and the hand set of the portable telephone apparatus is placed across said lower guard portion of said lock bar; the hand set further engages the transceiver of the portable telephone apparatus, thereby providing normal operation for the telephone apparatus and further positioning the telephone hand set in a position ready for use and protected from lateral movement by means of said first, second, third, and fourth sides of said open container and said first and second depending member of said lock bar.

12. The security bracket of claim 11 wherein:
said hinge securing portion, said opposite securing portion, said first and second depending members, and said lower guard portion of said lock bar are each formed of planar sheet material.

13. The security bracket of claim 11 wherein:
said container base first and second flanges are pivotally secured to said combination mounting base and base support first and second flanges respectively.

14. The security bracket of claim 13, further including:
locking means removably attached to said container base first and second flanges and said combination base and base support first and second flanges, whereby said container base first and second flanges are selectively immovably secured to said combination base and base support first and second flanges respectively.

15. The security bracket of claim 11 wherein:
said first and third sides of said open container each have opposite ends, with said open container first and third side opposite ends defining the length of said open container; and,
said lock bar is provided with a width substantially one third of said length of said open container.

16. The security bracket of claim 11 wherein:
said upper edge and said lower edge of said first and third sides of said open container define the depth of said open container; and, said first and second depending members of said lock bar each have lengths substantially one half of said depth of said open container.

17. The security bracket of claim 11 wherein:

said combination mounting base and base support first and second attachment flanges each form an obtuse angle respectively with said combination mounting base and base support first and second flanges depending from said combination mounting base and base support upper plate to provide for the attachment of said combination mounting base and base support to a central tunnel structure of a vehicle.

18. The security bracket of claim 11 wherein:
said security bracket is formed of metal.
19. The security bracket of claim 18 wherein:
said security bracket is formed of steel.
20. The security bracket of claim 18 wherein:
said security bracket is formed of aluminum.

* * * * *